United States Patent
Puri et al.

(10) Patent No.: US 8,129,638 B2
(45) Date of Patent: Mar. 6, 2012

(54) SWITCH COMPRISING A COUPLING FOR FIXING TO AN ACTUATING DEVICE

(75) Inventors: Werner Puri, Nürnberg (DE); Joachim Seidl, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 542 days.

(21) Appl. No.: 12/309,350

(22) PCT Filed: Jun. 21, 2007

(86) PCT No.: PCT/EP2007/056209
§ 371 (c)(1),
(2), (4) Date: Jan. 15, 2009

(87) PCT Pub. No.: WO2008/009535
PCT Pub. Date: Jan. 24, 2008

(65) Prior Publication Data
US 2009/0242371 A1   Oct. 1, 2009

(30) Foreign Application Priority Data
Jul. 17, 2006   (EP) ..................................... 06014845

(51) Int. Cl.
*H01H 9/28* (2006.01)
(52) U.S. Cl. .................. 200/43.16; 200/43.18
(58) Field of Classification Search ............... 200/43.16, 200/43.18, 318, 321, 329, 341; 403/359.1, 403/322.3, 322.4
See application file for complete search history.

(56) References Cited

U.S. PATENT DOCUMENTS

| 4,175,221 | A  | * | 11/1979 | Kellogg ........................... 200/4 |
| 6,376,785 | B1 | * | 4/2002  | Graninger ................... 200/50.02 |
| 6,730,867 | B2 | * | 5/2004  | Hyp ............................. 200/318 |
| 6,949,711 | B1 | * | 9/2005  | Litteer ....................... 200/43.01 |

FOREIGN PATENT DOCUMENTS

| DE | 846 716   | 8/1952  |
| DE | 1 155 183 | 10/1963 |
| DE | 2 256 937 | 6/1974  |
| DE | 38 37 636 | 5/1990  |
| GB | 1 407 360 | 9/1975  |

* cited by examiner

*Primary Examiner* — Anh Mai
*Assistant Examiner* — Lisa Homza
(74) *Attorney, Agent, or Firm* — Harness, Dickey & Pierce, P.L.C.

(57) ABSTRACT

A switch is disclosed, especially a position switch including a coupling for fixing a drive head to the base of a locking ring. The switch provides a technical solution to allow for a reliable operation of the switch and to simultaneously guide potentially damaging force effects from the drive head via the coupling to the housing of the switch. To this end, in at least one embodiment, first, second and third noses are used, which have an arrangement or shape enabling an essentially non-positive force transmission to be carried out. Furthermore, improved or even optimum handling by the user is ensured, especially for replacement of the drive head.

25 Claims, 4 Drawing Sheets

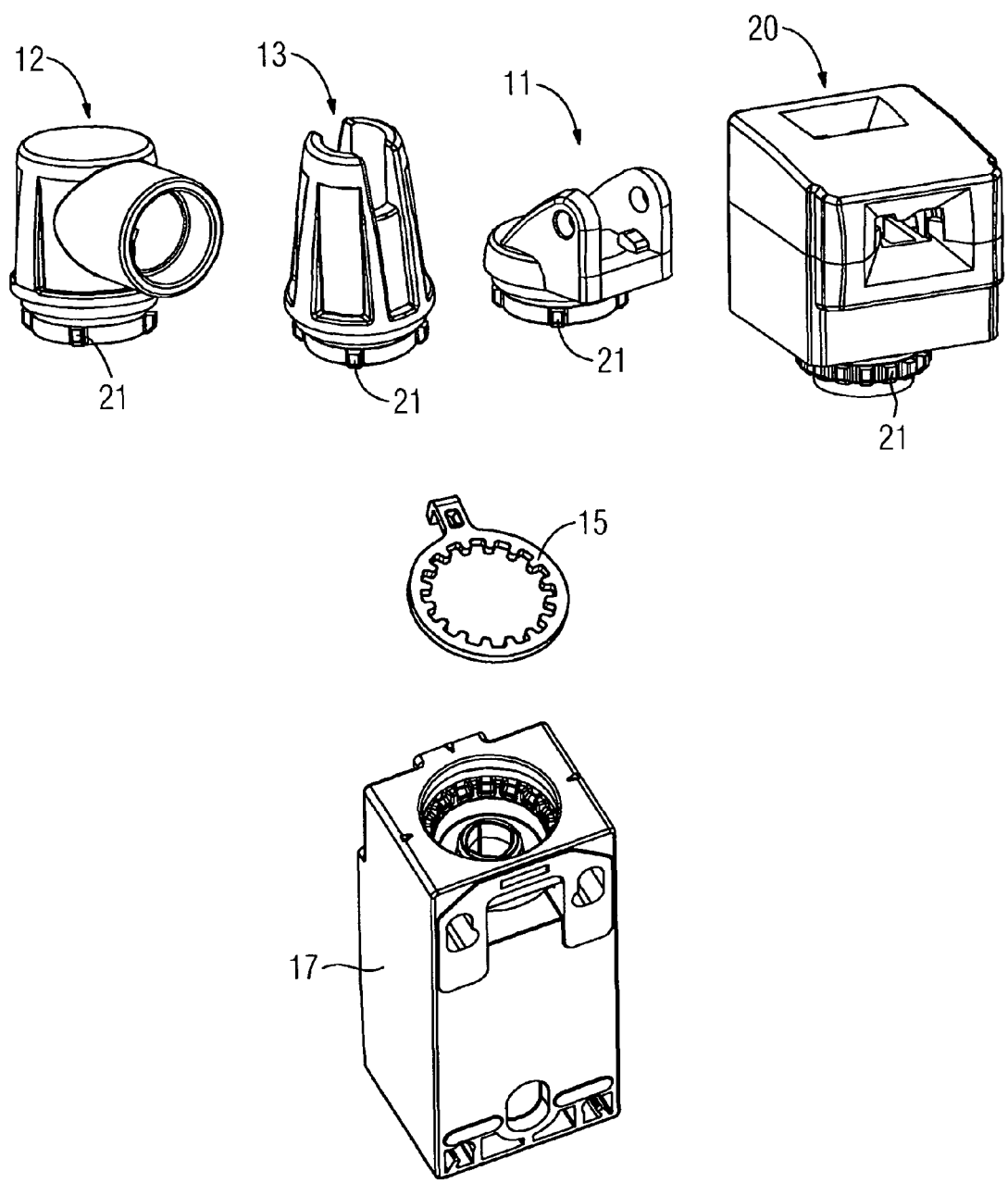

SWITCH COMPRISING A COUPLING FOR FIXING TO AN ACTUATING DEVICE

PRIORITY STATEMENT

This application is the national phase under 35 U.S.C. §371 of PCT International Application No. PCT/EP2007/056209 which has an International filing date of Jun. 21, 2007, which designated the United States of America, the entire contents of which are hereby incorporated herein by reference.

FIELD

At least one embodiment of the present invention generally relates to a switch. In at least one embodiment, the switch includes a coupling for fixing to an actuating device, with the coupling having first noses for precise-fit insertion of second noses of the fixing device, and a locking ring with third noses formed on the inner circumference for latching the fixing device.

In at least one embodiment, such a switch may be generally embodied as an electromechanical switching device and may be widely used for example as a position switch or safety switch in automation technology, plant engineering and building technology.

In at least one embodiment, a use of such switches or switching devices can include monitoring protective devices, such as security doors and protective grilles for example, or also monitoring the movement of machine parts.

BACKGROUND

Essentially position switches and safety switches include a switch housing which an actuator attached thereto, which is also referred to as a drive or drive head. If this actuator, which is embodied for example as a roller plunger or a lever, as a pivoting lever or a rod lever or as spring bar is actuated, a switching element or switching unit arranged in the switch housing and effectively connected to the actuator is actuated.

With the appropriate positioning and installation, the actuation of the actuator, for example by the movement of a machine or the opening of a protective door, brings about a forced opening of the switching unit and of a monitoring circuit connected to it.

In the past the effect of the force on the drive head has proved to be problematic. On the one hand it is a matter of transmitting the force effect to actuate the switching element in a suitable, mechanical manner to a piston which initiates the switching of the switching element. On the other hand undesired force effects arise which must be captured by the switch or by the switching device containing the switch and are not able to be used to actuate it.

Previously the above-mentioned problem was resolved for example by screw fixings, so that the drives were fixed to the switch housing by screws. This led a plurality of easy-to-mislay small parts, such as screws for example, as well as to difficult and customer-unfriendly disassembly or assembly using at least one tool.

So-called bayonet connectors were likewise used for fixing drives to the housing. The disadvantage in such cases is that the bayonet connections are expensive to manufacture, and also they do not produce a connection which is free from play. A positive connection between the drive and the housing however proves to be indispensable in practice in most cases.

Push-in connections have also been developed in the past, with which the drives have been fixed to the housing a linearly-guided slider. These arrangements can be criticized for the small contact surfaces of the drive and of the housing, resulting in the connection not being very firm. In particular the safety or position switch with a sliding catch is especially susceptible to torsional forces.

Rim couplings have long been known for fixing control circuit devices into a mounting hole of a front panel. This involves couplings which mechanically connect the actuator with the switching element and the undesired force effect is dissipated via a front panel, which means that the rim coupling would not have to be protected from any undesired damage from transmitted forces.

DE 225 69 37 discloses a coupling for connection of front elements to the built-in components of electrical control circuit devices. The coupling is characterized by the end of a front element located behind the front panel being embodied as a cylindrical connecting piece onto which an annular cage formed onto the extension element is able to be pushed in which a locking ring is supported concentrically to allow rotation and prevent axial movement.

SUMMARY

At least one embodiment of the invention is directed to a switch, especially a position or safety switch, which safely transmits damaging force effects arising from the drive through its actuation via the coupling to the switch housing and simultaneously ensures a safe actuation of the switching element, as well as user-friendly operation.

At least one embodiment of the invention is directed to, for a switch, the actuating device being embodied as a drive head and a force effect arising as a result of an actuation of the drive head being able to be transmitted essentially positively via the coupling by an arrangement and/or forming of the first, second and/or third noses.

Inventively, at least one embodiment of the switch features an actuating device which is connected via a coupling to the housing of the switch. First noses of the coupling are arranged in the housing or in a part of the housing in the form of a ring. The precisely matching second noses of the drive head are intended to be inserted to form a precise fit into the first noses. The coupling also has a locking ring which features third noses formed onto its inner circumference. The locking ring can assume a locking position and an unlocking position. The locking ring is in the unlocking position if the second noses are able to be inserted into or removed from the first noses to form a precise fit. This can be achieved for example for the case in which the locking ring is inserted in the switch housing by the third noses of the locking ring forming a flush fit with the first noses.

If the locking ring is provided for insertion onto the drive, the third noses of the locking ring fit flush with the second noses of the drive head in the unlocking position. The locking position is achieved whenever the third noses prevent the second noses being pushed out of the first noses, or vice versa. The force effect arising when the drive head is actuated can be transmitted positively via the coupling by way of an arrangement and/or forming of the first, second and/or third noses.

A part of the force effect is used for actuation of at least of one switching element. Undesired force effects, such as the effects of a torsional force for example, a parallel and/or perpendicular force to the direction of pushing in, are transmitted by the essentially form-fit coupling, especially from the second noses to the first noses. Especially for force effects along or in opposition to the push-in direction, the third noses of the locking ring can also be provided for transmission of the undesired force effect.

Advantageously the transmission of the force via the coupling can be optimized via a corresponding arrangement of the first, second and/or third noses. Thus for example through a symmetrical or asymmetrical arrangement of the first, second and/or third noses a locally occurring force effect can be safely captured. This applies especially to places at which disadvantageous play of the components is to be expected.

Advantageously the form of the first, second and/or third noses are variable, so that adhesion or friction forces of the first second and/or third noses involved can be exploited to the optimum. It is advantageous for example for the first, second and/or third noses to capture one or more force effects which are essentially perpendicular to a plurality of nose surfaces.

In an advantageous embodiment the locking ring features a lever or at least one activation area which can be actuated by the user, especially with a closed switch housing. The important fact here is that the user or the installer does not need any further tools, in order for example to exchange the drive head subject to a higher level of wear. In this case no unnecessary installation steps, such as the opening up of the switch housing for example, are needed. Instead the user, by actuating the lever or the actuation area, can bring the locking ring from its locking position into its unlocking position or vice versa.

Where possible, however, access by the user is to be avoided. Therefore an embodiment is advantageous in which the correctly attached cover forces the locking ring using the actuation area into the locking position or is only able to be installed in this position. Undesired access by the user is then for example able to be avoided by tamper-proof screws or coded screws or at least able to be detected by sealed screws.

In a further advantageous embodiment, the coupling is provided for continuous operation with a specific force effect. If the switch is subjected because of the desired application to a specific force effect which is known in advance, this can be taken into account in the arrangement and/or the forms of the first, second and/or third noses, in order to ensure an optimum transmission of force to the housing.

In a further advantageous embodiment, the shape of the first, second and/or third noses is equipped with a number of edges essentially parallel to the direction of insertion. On the one hand the essentially parallel edges are used for secure guidance, but also for an effective positive fit of the noses. In addition the surface of the noses is increased by the increased number of essentially parallel edges, of which the adhesion forces act advantageously in relation to the force transmission from the drive head to the housing to be captured.

In an advantageous embodiment, the form of the first, second and/or third noses is at least partly cylindrical. This proves advantageous, especially if the directions of the damaging force effects are not known in advance. Thus a switch with noses formed in this way could be used as a universal switch for different types of drive heads which lead to different force effects, could be avoidable or used as a switch in which the actuation of different elements with different respective directions of actuation act on the drive head.

In an advantageous embodiment, the arrangement of the first, second and/or third noses is essentially annular symmetrical or essentially annular asymmetrical. The effect of this is that a specific housing is only intended for specific drive bodies, of which the arrangement of the second noses engages in the arrangement of the first noses of the housing. It is consequently ensured that the housing only supports a specific type of drive heads and is thus designed for one specific or for a number of specific types of force effects.

In a further advantageous embodiment, the arrangement of the first, second and/or third noses is provided, with first second and/or third noses set at least partly at an angle. The angled setting ensures that the adhesion forces and/or friction forces are used to the optimum in that the force effects being directed essentially perpendicular to the surface of the noses.

However a certain play in edge areas of the nose arrangements, especially of the third noses, can be of advantage since sticking is prevented or easier handling of the locking ring is made possible. This play can in this case be implemented by an indentation which is produced in the punching process during the manufacturing of the noses.

Advantageously the force effect arising as a result of the actuation of the drive head can be dissipated via the coupling onto the switch housing. In addition to a mechanically stable and durable attachment of the drive this also produces the option of making the coupling smaller than for example in a bayonet connection, with the support capability or the durability being at least equal. In addition the assembly and disassembly of the drive is possible once the switch is installed. In this case the actuation path of the lever or of the actuation area is predetermined by the form of the first, second and/or third noses, so that a smaller actuation path can be provided for safe locking an unlocking and simultaneously represents a certain convenience for the user.

Further advantageous embodiments and example developments of the invention are to be taken from the descriptions of the figures and/or the subclaims.

BRIEF DESCRIPTION OF THE DRAWINGS

The invention is described and explained in more detail below on the basis of the example embodiments shown in the figures.

The figures are as follows.

DETAILED DESCRIPTION OF THE EXAMPLE EMBODIMENTS

Figure 1:
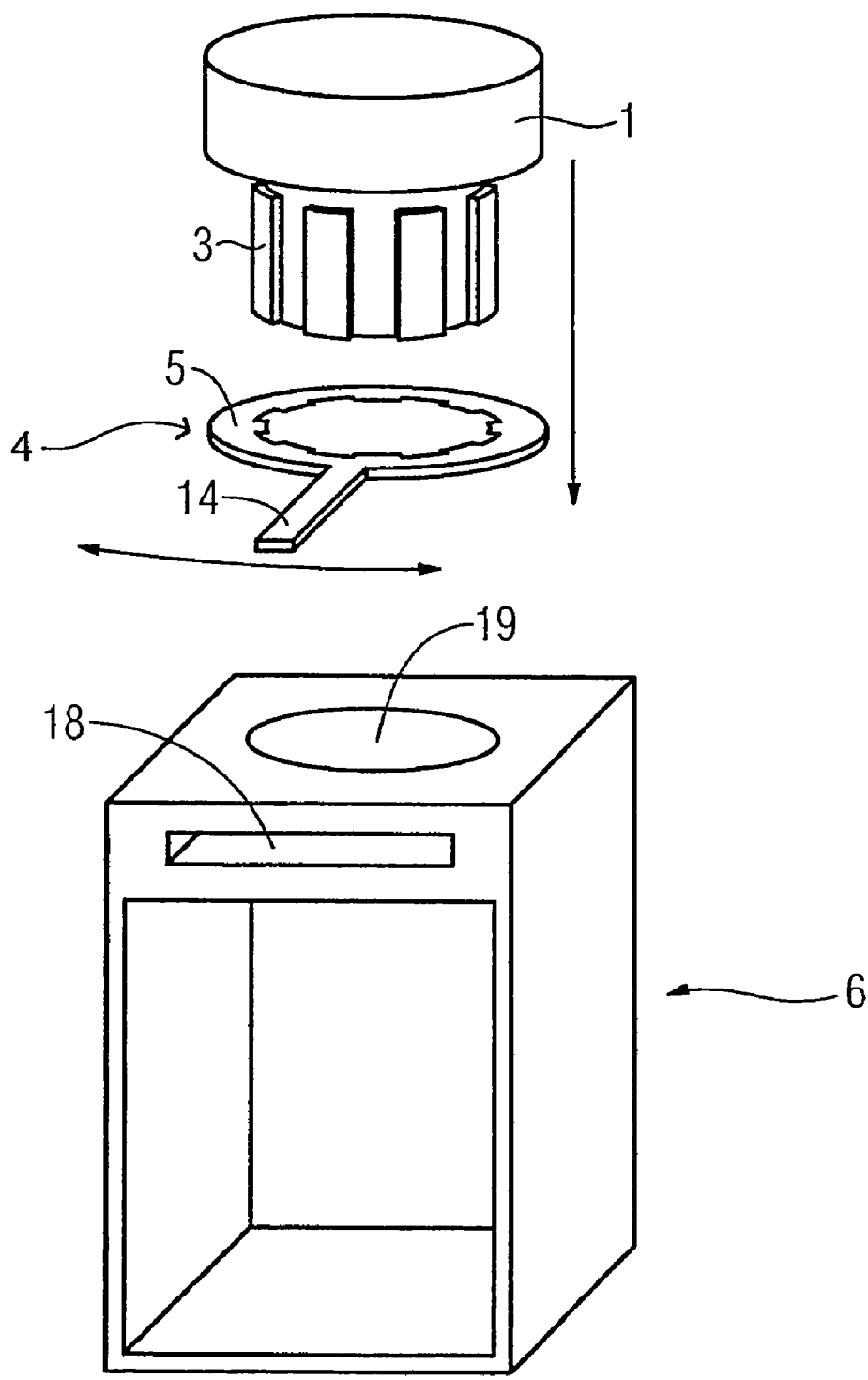
FIG. 1 components of an example embodiment of a positioning or safety switch in the disassembled state, FIG. 2 a first example embodiment of a drive head, FIG. 3 a second example embodiment of a drive head, FIG. 4 a third example embodiment of a drive head, FIG. 5 a view of a partly cutaway position switch, FIG. 6 a view of the partly cutaway position switch from FIG. 5 with assembled locking ring, and FIG. 7 a position switch system.

FIG. 1 shows components of a position or safety switch in a disassembled state. The components concerned are a housing 6, a locking ring 4 and a drive 1 with second noses 3. With drive 1, the actuation mechanism has not been depicted and the diagram concentrates on the drive head 1.

In this example embodiment, the locking ring 4 is designed to be pushed through the slot 18 on the housing 6. In the introduced position, the locking ring 4 can assume an unlocking and a locking position, with the third noses 5 of the locking ring 4 aligning with the first noses of the housing (not shown here) during unlocking or at least partly not aligning with the first noses during locking.

The housing 6 is able to be installed where it is to be used and is intended for receiving a switching element. In the unlocking position the drive 1 is able to be lowered down the second noses 3 into the housing opening 19. As it is lowered in the second noses 3, making a precise fit where possible, move past the third noses 5. In the subsequent locking the locking ring 4 is moved by way of the actuation area 14, for example by the user, such that the third noses 5 are located at the upper end of the second noses 3 within the housing 6. Thus the second noses 3 are held by a positive fit and enclosed on the one hand by the third noses 5 and on the other hand by the first noses within the housing 6. The locking ring 4 prevents an undesired release of the drive 1 and absorbs undesired force effects opposing the direction of insertion. Further force effects on the drive head, provided they are not able to be used for actuation, are directed from drive 1 via the positive fit of the first and second noses to the housing 6.

It proves to be extremely advantageous for an undesired force effect to be able to be transmitted safely from the drive head 1 to the housing 6 without small parts that can get lost.

The user is now easily able to exchange a damaged drive 1 without any great installation effort or to use another drive which has the same coupling properties, together with the housing 6.

Figure 2:
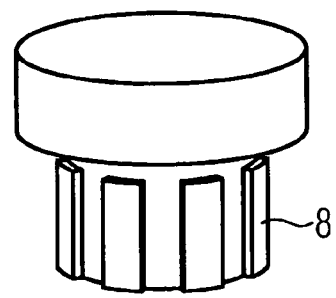
Figure 3:
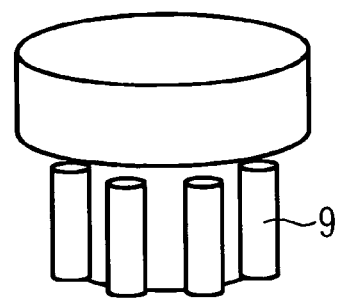
Figure 4:
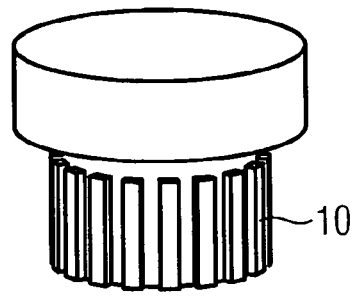

FIGS. 2, 3, 4 show a first, second and third example embodiment of a drive head respectively. In this case the number of the second noses 8, 9, 10 and the form of the noses has been varied to the advantage of the respective applications.

Thus for example the second noses 8 are embodied in a rectangular shape and assume a specific placement here depending on their position. The advantage lies in the fact that the second noses 8 are turned such that an optimum force transfer from drive to the housing is able to be brought about. The angled position can be implemented by a known force effect such that on the one hand a large overall area is produced to capture the force effect and on the other hand the force effect is directed where possible perpendicular to this overall area which is composed of the individual surfaces of the second noses 8.

The cylindrically embodied second noses 9 of the second example embodiment make possible an optimum force acceptance especially perpendicular to the direction of insertion of the drive head. The symmetrical annular arrangement of the second noses 9 produces the same positive fit for each perpendicular force effect. In additional the cylindrical form of the second noses 9 causes the force to be largely perpendicular on the surface of the second noses 9 regardless of their perpendicular direction of action. This ensures an optimum transfer of force in a position switch specially designed for such force effects.

The second noses 10 are rectangular and arranged in a large number around a ring. This leads to a user-friendly small actuation path of the locking ring. In addition the overall surface which comprises the individual surfaces of the second noses 10 is very large. This guarantees a very secure transmission of force from any directions perpendicular to the insertion direction.

Figure 5:
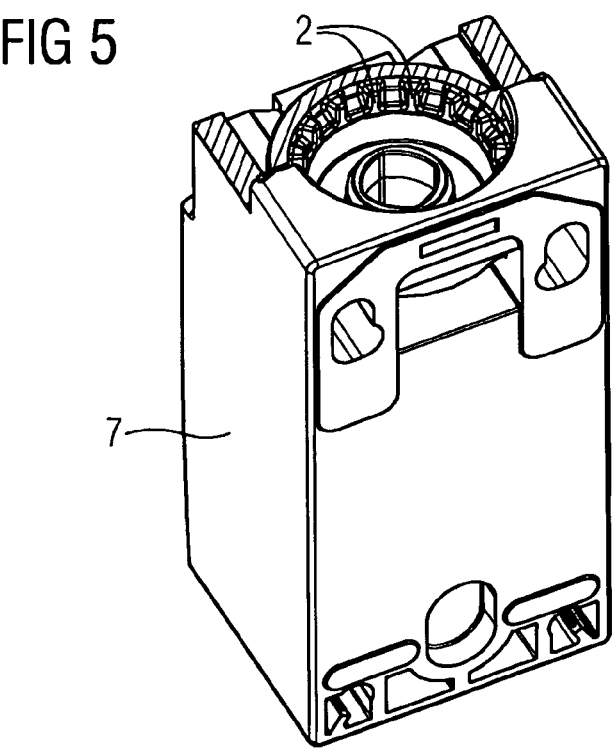

FIG. 5 shows a position switch housing. A symmetrical arrangement of first noses 2 of the housing 7 can be seen.

Figure 6:
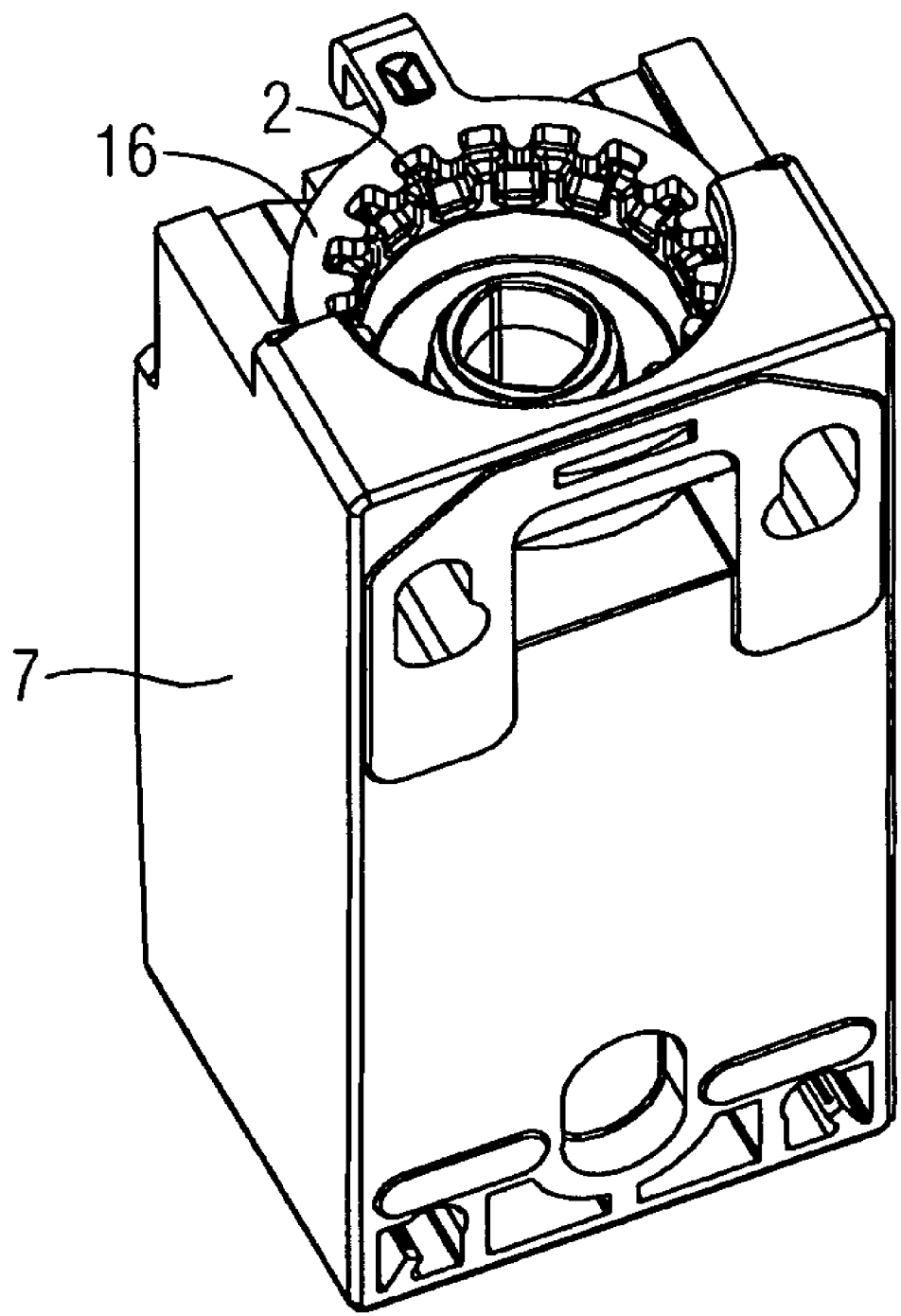

FIG. 6 shows a locking ring 16 mounted in the housing 7 for the example embodiment shown in FIG. 5. The locking ring 16 can be prevented from falling out by being suitably shaped, for example in an undulation, or by an additional component.

The locking ring 16 is located in its locking position, with the drive not being shown. It can clearly be seen that the noses involved are not aligned. It can further be seen that the actuation path can be regulated via the dimensioning of the noses involved.

It can further be of advantage, if through a suitable variant of the actuation area the opening and closure of the coupling can be undertaken using a tool or manually. The use of a tool is for example worthwhile if opening or closure by the user is not desirable.

With safety switches it is advantageous to recess the actuation area, which can be embodied as a pin or lever for example, into the housing 7, in order to prevent the connection being opened easily. As an alternative or in addition the actuation movement can be locked by the introduction of a fixing piece (not shown). The fixing piece can in this case simultaneously define the area of movement of the actuation area, so that an unlocking position and a locking position are predetermined. In addition cutouts can be formed on the fixing piece in order to cause the actuation area to snap in when the respective position is reached. It is likewise conceivable for the fixing piece to fully block a change in the position of the locking ring 16 in order to prevent manipulation by the user. The locking ring would then only be able to be removed with the corresponding tool (e.g. a screwdriver).

FIG. 7 shows a position switch system. The position switch system consists of a housing 17, a locking ring 15, and four different, at least partly depicted drive heads 11, 12, 13 and 20. The locking ring 15 is able to be installed in a similar manner in the housing 17 (as described in FIG. 1). The user can employ this position switch system flexibly since the drive heads 11, 12, 13, 20 involved are able to be replaced as required in the manner already described. In this case account can be taken of the respective application of the position switch, or of the corresponding force effect of the actuating objects, such as a door, a flap or a movable machine part for example. Consequently the possible number of different drive heads 11, 12, 13, 20 is not restricted.

The drive head 13 is shown complete and is intended for actuations along the direction of insertion. Drive heads 11, 12 are only partly shown and are also for intended for force effects perpendicular to the direction of insertion.

Drive head 20 is for designed for separate actuators which are attached directly to the object. This drive head 20 has a plurality of second noses 21 and is consequently better protected by the positive fit of the second noses 21 after installation against undesired force effects of the object to be protected compared to the drive bodies 11, 12 or 13, which are designed with a smaller number for lower force effects. The force acceptance capability is consequently able to be regulated by way of the number of the second noses 21. Despite this drive heads with different numbers of second noses 21 can operate with the same housing 17, provided the suitable positions and a suitable shape for the second noses 21 is used.

In summary, at least one embodiment of the invention relates to a switch, especially a position switch, with a coupling for attachment of a drive head based on a locking ring. A technical teaching is specified in order to guarantee safe operation of the switch and simultaneously to direct potentially damaging force effects from the drive head via the coupling onto the housing of the switch. In such cases first, second and third noses are used, through the arrangement or shape of which an essentially positive force transmission is realized. In addition optimum handling by the user, especially when exchanging the drive head, is guaranteed.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A switch, comprising:
   a coupling for attachment of an actuating device embodied as a drive head, the coupling including first noses arranged in a switch housing and protruding into an opening in the switch housing configured to receive the drive head;

second noses arranged on and protruding from the drive head for precise insertion of the drive head into the housing; and a locking ring including third noses, formed on an inner circumference of the locking ring for locking the drive head, wherein the coupling is configured to move with actuation of the drive head such that a force effect arising as a result of the actuation of the drive head is transmitted via the coupling to the switch housing by way of at least one of an arrangement and shape of at least one of the first, second and third noses essentially positively.

2. The switch as claimed in claim 1, wherein the locking ring includes an actuation area able to be actuated by a user.

3. The switch as claimed in claim 1, wherein a position of the locking ring is predetermined for correct switch installation.

4. The switch as claimed in claim 1, wherein the force effect is at least one of a torsion force effect and a force effect at least one of along, in opposition to and perpendicular to a direction of insertion.

5. The switch as claimed in claim 1, wherein the coupling is provided for ongoing operation of a force acting from a particular direction.

6. The switch as claimed in claim 1, wherein the shape of at least one of the first noses, second noses and third noses includes a number of edges essentially parallel to an insertion direction.

7. The switch as claimed in claim 1, wherein the shape of at least one of the first noses, second noses and third noses is at least partly cylindrical, conical, spherical or similar.

8. The switch as claimed in claim 1, wherein at least one of the first noses, second noses and third noses is essentially arranged in a symmetrical ring or in an asymmetrical ring.

9. The switch as claimed in claim 1, wherein at least one of the first noses, second noses and third noses is arranged with at least one of first, second and third noses positioned at least partly at an angle.

10. The switch as claimed in claim 1, wherein the force effect arising as a result of actuating the drive head is able to be dissipated via the coupling onto the switch housing.

11. The switch as claimed in claim 1, wherein the locking ring includes a locking aid.

12. The switch as claimed in claim 1, wherein the switch housing includes a housing part which is used for latching an actuation area and a slot in which the actuation area of the locking protrudes through the switch housing.

13. The switch as claimed in claim 12, wherein the housing part is not able to be installed in the unlocking position of the locking ring.

14. The switch as claimed in claim 2, wherein the actuation area is accommodated at a rear of the switch when the switch is correctly installed.

15. The switch as claimed in claim 1, wherein a fixing piece is provided for specifying a locking position and an unlocking position of the locking ring.

16. The switch as claimed in claim 15, wherein the fixing piece is provided by a flexible part for tactile feedback.

17. The switch as claimed in claim 15, wherein the fixing piece is only removable out of the locking position by way of a tool.

18. The switch as claimed in claim 1, wherein the switch is embodied as a position or safety switch.

19. The switch of claim 1, wherein the switch is a position switch.

20. The switch as claimed in claim 1, wherein the locking ring includes an actuation area able to be actuated with the switch housing closed.

21. The switch as claimed in claim 1, wherein a position of the locking ring is predetermined for correct switch installation with a closed switch housing.

22. The switch as claimed in claim 1, wherein the locking ring includes a locking aid embodied as a punched indentation.

23. The switch as claimed in claim 1, wherein the switch housing includes a housing part which is used for latching the actuation area in the locking position.

24. A switch, comprising:
a coupling configured to attach an actuating device to the switch, the coupling including at least one first nose to cooperate with at least one second nose of the actuating device and including a locking ring, the locking ring including at least one third nose formed on an inner circumference of the locking ring, to lock the actuating device, wherein the coupling is configured to move with actuation of the actuating device such that a force effect, arising upon actuation of the actuating device, being transmitted via the coupling to a housing of the switch by way of at least one of an arrangement and shape of at least one of the first, second and third at least one nose essentially positively.

25. A coupling, to attach an actuating device for a switch, the coupling comprising:
at least one first nose in a switch housing to cooperate with at least one second nose of the actuating device; and
a locking ring, the locking ring including at least one third nose formed on an inner circumference of the locking ring, to lock the actuating device, wherein the coupling is configured to move with actuation of the actuating device such that a force effect, arising upon actuation of the actuating device, being transmitted via the coupling to a housing of the switch by way of at least one of an arrangement and shape of at least one of the first, second and third at least one nose essentially positively.

* * * * *